(12) United States Patent
Krutsch et al.

(10) Patent No.: US 10,726,345 B2
(45) Date of Patent: Jul. 28, 2020

(54) METHODS, PROCESSING ENGINES, AND MICROPROCESSORS FOR CLASSIFYING DATA ACCORDING TO DECISION TREES

(71) Applicant: NXP USA, Inc., Austin, TX (US)

(72) Inventors: Robert Krutsch, Munich (DE); Michael Staudenmaier, Munich (DE); Stephan Herrmann, Markt Schwaben (DE)

(73) Assignee: NXP USA, Inc., Austin, TX (US)

( * ) Notice: Subject to any disclaimer, the term of this patent is extended or adjusted under 35 U.S.C. 154(b) by 332 days.

(21) Appl. No.: 15/878,888

(22) Filed: Jan. 24, 2018

(65) Prior Publication Data
US 2019/0005396 A1  Jan. 3, 2019

(30) Foreign Application Priority Data
Jun. 28, 2017 (EP) .................... 17178311

(51) Int. Cl.
| | | |
|---|---|---|
| *G06N 5/04* | (2006.01) | |
| *G06K 9/62* | (2006.01) | |
| *G06K 9/00* | (2006.01) | |
| *G06N 20/00* | (2019.01) | |
| *G06F 16/90* | (2019.01) | |
| *G05D 1/08* | (2006.01) | |

(Continued)

(52) U.S. Cl.
CPC .......... *G06N 5/045* (2013.01); *G05D 1/0088* (2013.01); *G06F 16/285* (2019.01); *G06F 16/9017* (2019.01); *G06K 9/00805* (2013.01); *G06K 9/00986* (2013.01); *G06K 9/6282* (2013.01); *G06N 20/00* (2019.01)

(58) Field of Classification Search
CPC .............. G06F 16/285; G06F 16/9017; G06K 9/00805; G06K 9/00986; G06K 9/6282; G06N 20/00; G06N 5/045; G05D 1/0088
See application file for complete search history.

(56) References Cited

U.S. PATENT DOCUMENTS 4,571,679 A * 2/1986 Russell .................. G06F 11/00
714/25
4,881,230 A * 11/1989 Clark .................. G06F 11/2257
714/712

(Continued)

OTHER PUBLICATIONS

Tong et al., "High-throughput Traffic Classification on Multi-core Processors*", 2014 IEEE 15th International Conference on High Performance Switching and Routing (HPSR), 8 pages.

(Continued)

*Primary Examiner* — Tyler J Lee (57) ABSTRACT

A processing engine for classifying data according to a decision tree having n-nodes is disclosed, wherein each node is represented by a respective test according to which a flag may be set or unset, comprising: a respective test unit and corresponding to each node, having an output flag and being configured to set or unset the respective output flag according to an output of the respective test; a memory configured to hold an n-bit word, each bit corresponding to a one of the respective output flags; and a data-structure configured as a look up table, each entry of the look up table representing a class of the data. Corresponding methods are also disclosed, as are devices and systems incorporating such processing engines.

14 Claims, 5 Drawing Sheets

(51) Int. Cl.
  *G06F 16/28*   (2019.01)
  *G06F 16/901*  (2019.01)
  *G05D 1/00*    (2006.01)

(56) References Cited

U.S. PATENT DOCUMENTS

| | | | | |
|---|---|---|---|---|
| 5,253,333 | A * | 10/1993 | Abe | G06N 5/025 |
| | | | | 706/53 |
| 5,497,485 | A * | 3/1996 | Ferguson | G06F 16/9027 |
| 5,745,601 | A * | 4/1998 | Lee | G06K 9/00127 |
| | | | | 382/225 |
| 8,856,203 | B1 | 10/2014 | Schelp et al. | |
| 2005/0240924 | A1* | 10/2005 | Jones | G06F 9/4881 |
| | | | | 718/100 |
| 2009/0119392 | A1* | 5/2009 | Bonjour | H04L 41/0893 |
| | | | | 709/223 |
| 2010/0094800 | A1 | 4/2010 | Sharp | |
| 2013/0044924 | A1 | 2/2013 | Spencer | |
| 2015/0262062 | A1* | 9/2015 | Burger | G06N 5/025 |
| | | | | 706/46 |
| 2015/0262063 | A1* | 9/2015 | Burger | G06N 5/025 |
| | | | | 706/46 |
| 2015/0262064 | A1* | 9/2015 | Burger | G06N 5/022 |
| | | | | 706/46 |
| 2016/0217386 | A1* | 7/2016 | Hegde | G06N 20/00 |

OTHER PUBLICATIONS

NXP/Freescale, "StarCore DSP, StarCore SC3900FP, Flexible vector processor," https://www.nxp.com/docs/en/brochure/BRSC3900DSPCORE.pdf, downloaded Jan. 23, 2018, 6 pages.

Janssen, R. et al., "Hybrid Approach for Traffic Sign Recognition", Proceedings of the Intelligent Vehicles Symposium, Jan. 1, 1993, pp. 390-395, IEEE, Piscataway, NJ, USA.

Naji, Sinan A., "Human Face Detection From Color Images Based on Multi-Skin Models, Rule-Based Geometrical Knowledge, and Artificial Neural Networks", Thesis, University of Malaya, Kuala Lumpur, Jan. 1, 2013, pp. 1-346, retrieved from the Internet at http://studentsrepo.um.edu.my/5668/1/Thesis_Sinan_Naji_-_WHA040026_PHD_FSKTM_.pdf.

* cited by examiner

|    | T1 | T2 | T3 |
|----|----|----|----|
| R2 | 0  | 0  | 0  |
| R3 | 0  | 0  | 1  |
| R1 | 0  | 1  | 0  |
| R1 | 0  | 1  | 1  |
| R0 | 1  | 0  | 0  |
| R0 | 1  | 0  | 1  |
| R0 | 1  | 1  | 0  |
| R0 | 1  | 1  | 1  |

*Figure 3*

| | T4 | T3 | T2 | T1 |
|---|---|---|---|---|
| R0 | 0 | 0 | 0 | 0 |
| R3 | 0 | 0 | 0 | 1 |
| R0 | 0 | 0 | 1 | 0 |
| R2 | 0 | 0 | 1 | 1 |
| R0 | 0 | 1 | 0 | 0 |
| R4 | 0 | 1 | 0 | 1 |
| R0 | 0 | 1 | 1 | 0 |
| R2 | 0 | 1 | 1 | 1 |
| R5 | 1 | 0 | 0 | 0 |
| R3 | 1 | 0 | 0 | 1 |
| R5 | 1 | 0 | 1 | 0 |
| R2 | 1 | 0 | 1 | 1 |
| R5 | 1 | 1 | 0 | 0 |
| R4 | 1 | 1 | 0 | 1 |
| R5 | 1 | 1 | 1 | 0 |
| R2 | 1 | 1 | 1 | 1 |

METHODS, PROCESSING ENGINES, AND MICROPROCESSORS FOR CLASSIFYING DATA ACCORDING TO DECISION TREES

FIELD

The present disclosure relates to the field of processing engines and methods for classifying data according to decision trees, and to applications thereof, including automobile driver assistance processing engines, and object recognition units.

BACKGROUND

Decision trees are widely used in many fields of computation. In particular, they are useful for classifying data into various predefined types or classes, according to different characteristics of the data. For example and without limitation, in the field of advanced driving assistance and autonomous driving, it may be necessary or advantageous to classify different objects identified from a radar or video dataset, in order to determine the level of risk associated with each object. For instance it may be helpful to distinguish between a tree, a post-box, and a pedestrian: a tree may be assumed not to move once its location has been calculated; conversely, a pedestrian will require more detailed tracking as it is quite likely to move; moreover, a post-box may attract pedestrians towards it or may have pedestrians hidden from view behind it.

Another, non-limiting, example of the use of a decision tree is in the field of in-line inspection in manufacture processes. It may be required to check part-manufactured or completed articles, for quality control. This may be done using sensors—typically including cameras for visual inspection but potentially including other sensor types—by sensing properties of the article as it moves along a conveyor belt. Various characteristics (colour, size, shape, weight, or the like) of the article are sensed, and a processing engine such as a microprocessor is used to assess the characteristics to confirm whether or not the article meets specified quality requirements. The assessment may be carried out for each article, from the various input data, using a decision tree.

Conventional decision trees are processed serially, that is to say, one node of the tree is evaluated, and depending on the outcome of that evaluation, processing moves on to a subsequent node. As computational requirements become higher with increased volumes of input data or increased speed requirements, there has been a tendency to move towards parallel processing in many fields. However, conventionally decisions trees are not well-suited to parallel—and in particular to massively parallel—processing. Architectures and methods that allow or facilitate parallel processing in evaluating or classifying data according to decision trees are therefore desirable.

SUMMARY

According to a first aspect of the present disclosure, there is provided a processing engine for classifying data according to a decision tree having n-nodes, wherein each node is represented by a respective test according to which a flag may be set or unset, comprising: a respective test unit having an output flag corresponding to each node and being configured to set or unset the respective output flag according to an output of the respective test; a memory configured to hold an n-bit word, each bit corresponding to a one of the respective output flag; and a data-structure configured as a look up table, each entry of the look up table representing a class of the data.

Since the respective tests are not dependant on each other, the bits of the n-bit word may be determined in any sequence. This removes the requirement that the operations are carried out sequentially, and may provide for more flexible or distributed computation. In particular, it may result in improved or enhanced performance: conventional, typically pipelined, processing of decision trees does not cope well with changes to the processing flow, due to two issues, as will be described in more detail hereinbelow. Embodiments according to the present disclosure may not be affected by either of those issues.

In one or more embodiments, the look up table has $2^n$ entries. It will be appreciated that the size of the look up table increases rapidly as the number of nodes increases—that is to say, it changes exponentially with the number of nodes. However, the number of tests which must be carried out increases only linearly with the number of nodes. Generally the throughput will be determined by the number of tests. The computational effort is thus still manageable even with a large decision tree, although the look up table may become relatively large, and determining the class of data from the lookup table becomes more onerous. Providing the lookup table with $2^n$ entries results in a unique entry for each possible value of the n-bit word. The skilled person would appreciate that the look up table could have additional entries, although that would result in some level of obsolescence in the table. Fewer entries would require some additional computation prior to using the lookup table, and thus is not beneficial.

In one or more embodiments, the test units are distributed across a plurality of processing engines. The plurality of processing engines may be at least one of: a plurality of microprocessors, and a plurality of cores of a microprocessor. Since, according to processing engines and methods disclosed herein, the requirement that there is serial navigation through the decision tree has been relaxed or removed, the tests may be easily and conveniently distributed among multiple cores or multiple microprocessors, and in general among a plurality of processing engines. Such multiple cores or multiple microprocessors may include General Processing Units (GPUs) having several or many CUs Compute Units (CUs), and more generally, without limitation, include massively parallel systems. Moreover, since the tests need not be carried out in a specific sequence, there is no requirement for a feedback or other communication mechanism between the separate processing engines such as cores or microprocessors, to indicate when or if a delay occurs or a test is not completed in a particular clock cycle. The overall architecture for parallel processing engine is thus simplified. For massively parallel processing engines, this simplification may have a significant impact.

In one or more embodiments, the decision tree has no sub-branches. In the context of the present disclosure, the term "sub-branch" indicates that an individual node is not uniquely determinative of one class of the data: a node results in a sub-branch if, when implementing the decision tree in conventional fashion, at least one further test would be required before a specific class can be assigned to the data. In contrast, where a decision tree has no sub-branches, every node will lead directly to one leaf and one other node. It will be appreciated that any improvement performance in such an architecture may be not be as significant as in an architecture which does have sub-branches. Indeed, in architectures without sub-branches, there may in some circumstance not be any performance improvement. That is because, in processing engines and methods according to the present disclosure, every node must always be evaluated, before the classification is made, whereas with conventional implementation there will be situations when only one test is required: if the first node leads to a leaf, then no further tests would be required, conventionally. However, as will be described in more detail herein, embodiments according to the present disclosure may allow for simplified architecture, or be able to tolerate better delayed evaluation of individual tests at individual nodes. Decision trees without sub-branches, or with only few sub-branches, are known as heavily unbalanced decision trees In one or more other embodiments, the decision tree includes at least one sub-branch. From the discussion above it will be appreciated that processing engines and methods disclosed herein offer the potential for a greater performance improvement in such decision trees, and it is less likely that there would be a performance penalty, than for decision trees without any sub-branches.

According to a further aspect of the present disclosure, there is provided an object recognition unit including a processing engine as described above, and at least one surveillance device. A surveillance device may be, for instance and without limitation, an imaging device may be a camera for producing an optical image, a LIDAR (Light Detection And Ranging) device, or a RADAR (Radio Detection And Ranging) device. According to another aspect of the present disclosure, there is provided an automobile device for supporting at least one of advanced driver assistance and autonomous driving, comprising a surveillance unit, a processing engine as described above, and a response unit configured to, in response a classification determined by the processing engine, provide at least one of: an output indicative of a suggested driver response, and a vehicle response, According to yet further aspect of the present disclosure, there is provided a machine learning device comprising a processing engine as described above, and a learning unit configured to modify a part of the look up table.

According to another aspect of the present disclosure, there is provided a method of classifying data according to a decision tree having n-nodes, wherein each node is represented by a respective test according to which a respective flag may be set or unset, the method comprising: setting or unsetting each flag by performing the respective test on the data; constructing an n-bit word, each bit corresponding to a one of the n flags; and using a predetermined look up table to classify the data according to an entry in the look up table corresponding to the n-bit word.

In one of more embodiments, the tests are distributed across at least one of: a plurality of microprocessors, and a plurality of cores of a microprocessor.

In one of more embodiments the decision tree has no sub-branches. In such embodiments, only one class of data appears only once in the lookup table. In other embodiments, the decision tree has one or more sub-branches, such that more than one class of data appears only once in the lookup table.

In one of more embodiments, the method is implemented in software, and the i-th test, (Ti) on the data (R) takes the form:

$$(F(R,i) > a_i)$$

In such embodiments, the i-th flag may be set or unset according to a computation:

$$Ti = \text{sign } F(R,i) - a_i) << i$$

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Figure 1:
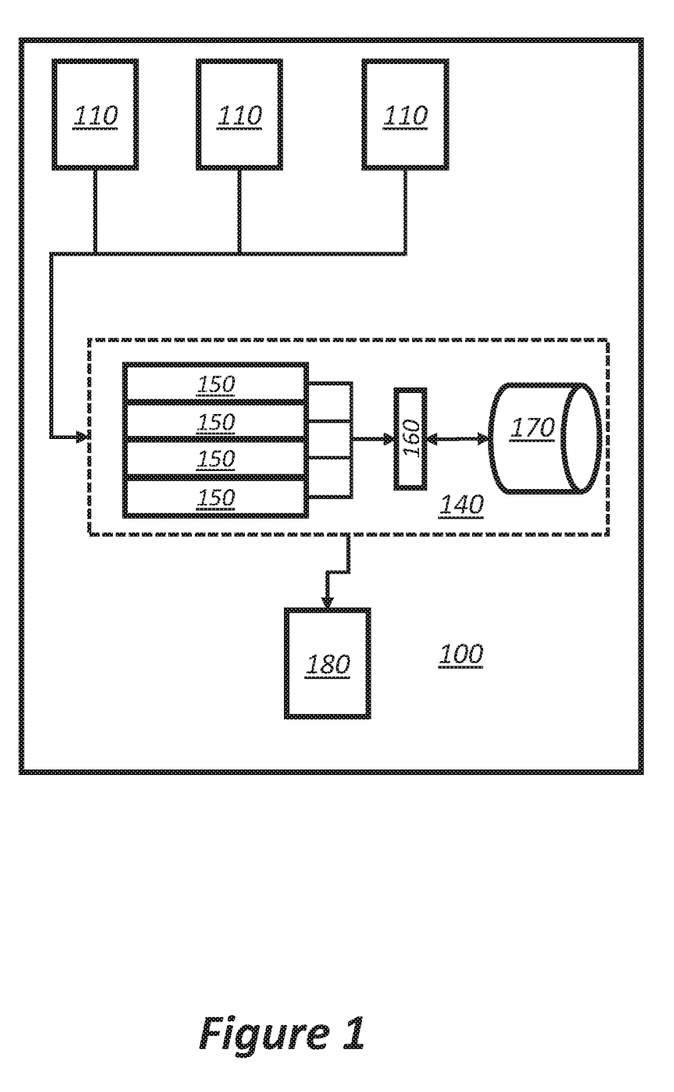
FIG. 1 illustrates a device according to one aspect of the present disclosure.

FIG. 1 illustrates a device 100 according to various embodiments of the present disclosure. The device may be, for instance, an automobile device for supporting at least one of advanced driver assistance and autonomous driving, an object recognition unit or a machine learning device The device 100 includes one or more surveillance units 110, a processing engine 140 and a response unit 180. The processing engine 140 controls the response of the response unit 180, to input data provided by the surveillance unit or units 110, based on classification of the input data. The specific range of responses provided by the response unit varies between embodiments and application—for instance in the case of an object recognition unit, the response may be to physically or electronically tag unrecognised objects. In the case of autonomous driving the response may be to actuate a vehicle's braking system or it's steering system in the proximity of a pedestrian.

The processing engine 140 is configured to classify data, which classification is done using a decision tree. The processing engine may be hardware-based, for instance it may be implemented as a microprocessor, or may be substantially software-based. Hereinunder the term "processing engine" will be used to refer to either hardware or software implementation. As will be described in more detail hereinunder, the processing engine includes a plurality of n test units 150, a memory 160 configured to hold an n-bit word, and a data structure configured as a look up table.

Decision trees include multiple decision points or tests, generally referred to as nodes. Each test can result in only one of two outcomes, and so decision trees according to the present disclosure may also be referred to as binary decision trees. Depending on the specific implementation the possible outcome may be represented as, for instance, "1" or "0", "true" or "false", "yes" or "no", or a flag being "set" or "unset". Hereinunder the test outcome will be described as resulting in flag being set or unset, but it will be appreciated that the flag may be implemented in any of the above ways (logically, digital, etc.), depending on the application, and whether the implementation is software based or hardware based.

As mentioned above, conventional decision trees are processed serially. Since the route or path through the decision tree is not known a priori (otherwise the final result would be also pre-determined) the processor awaits the result of each test before moving on. Another characteristic of conventional decision trees is that the outcome of a specific test or node may result in processing moving to either another node, or to a final result. A final result is known as a leaf.

Pipelined processors, as used in conventional decision tree implementations operating at high frequencies, are rather bad whenever the processing flow changes: this is a direct consequence of the pipelining in combination with the high frequencies achieved. Fundamentally, there are two problems or issues which cause this:

Firstly, a sequence such as the following usually causes a "stall" (or pipeline bubble):

CMP R0, R1 # compare instruction

BEQ label0 # branch if equal.

This arises since the evaluation of the compare may take too long, and so the result is not ready in time. What usually happens in consequence, is a "stall" of the pipeline (i.e. at least 1 extra clock cycle is needed before the processing can proceed)—although potentially only the branch (and everything after) is stalled.

Secondly, a conditional branch (i.e. a branch that cannot be evaluated immediately, that is to say in the first stage of the pipeline) is generally a problem: consider a 6-stage pipeline, and assume that it takes until pipeline stage 5 until the conditions are known, i.e. it becomes clear only by stage 5, whether the branch should be taken. Whatever is then in stage 1-4 (i.e. the instructions coming after the branch) is potentially obsolete: if the branch is taken they are removed from the pipeline (i.e. there are now 4 empty slots in the pipeline).

Consequently, even for just one highly pipelined processor it might be beneficial to just evaluate all comparisons and only have a single jump. According to the present disclosure, the only jump may be the look-up table process step.

Figure 2:
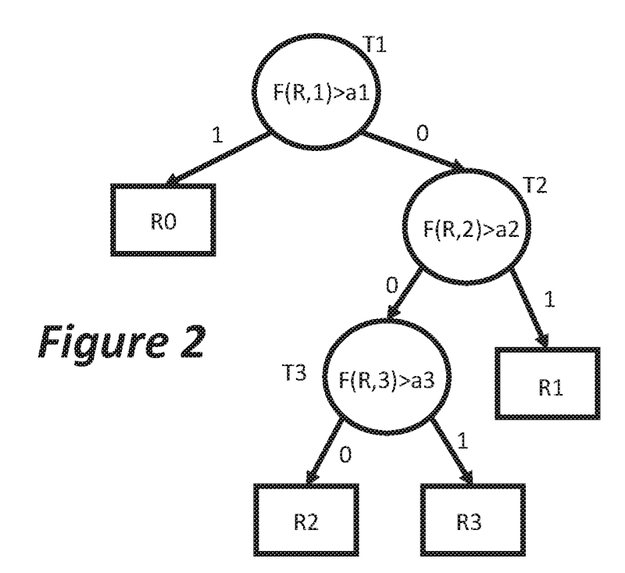
FIG. 2 illustrates a decision tree having 3 nodes and 3 levels.

In the simple form of decision tree, illustrated in FIG. 2, a first node T1, and all other nodes (T2) except the final, lowest level, node T3 are connected to one other node and to one result or leaf. That is to say, T1 is connected to T2 and leaf R0, T2 is connected to T3 and leaf R1. The final node T3 is connected to two leaves, R2 and R3. Such a tree is highly imbalanced. Evaluating data according to such a tree may require only one test to be evaluated, and intermediate number, or may require all tests to be evaluated.

Figures 4, 5:
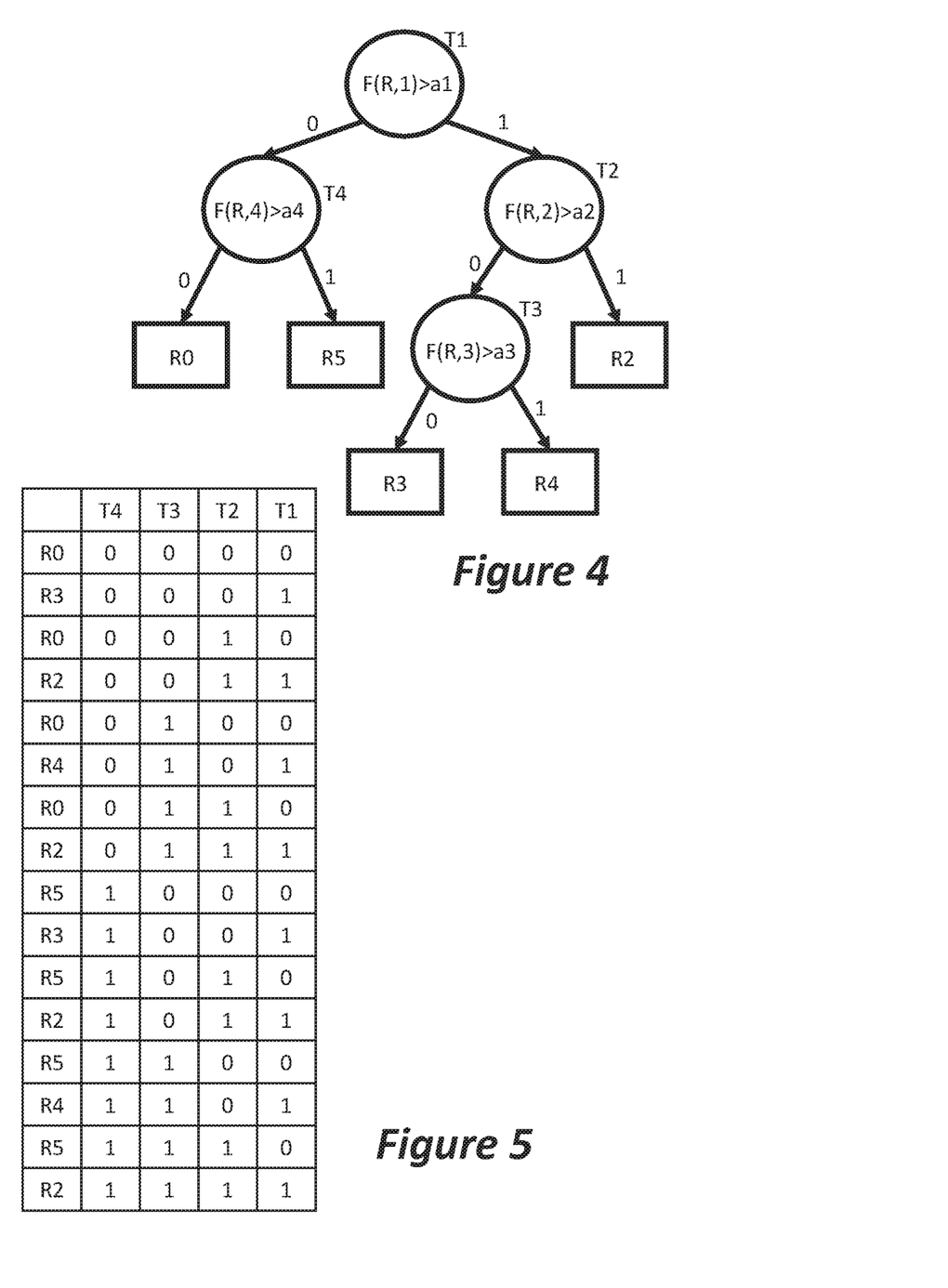
FIG. 4 illustrates a decision tree having 4 nodes and 3 levels.
FIG. 5 shows a truth table corresponding to the decision tree of FIG. 3.

A slightly more complex decision tree is illustrated in FIG. 4. This tree includes one node, shown at T1, which cannot by itself determine a final result. Instead it is connected to two other nodes (T2 and T4). This decision tree is characterised by having four nodes (and 5 leaves), although it still only has three levels.

As shown in FIGS. 2 and 4, each test may be characterised by whether a function meets a criterion. For instance, in the automotive example mentioned above, once an object has been identified, the decision tree may be used to classify whether the object is a post-box, for which one test may be whether an identified object has a straight edge (in which case it is more likely to be a post-box, than a pedestrian or a tree). Each test may thus be described as establishing whether a parameter (in this case, edge straightness), exceeds a threshold (in this case, linearity). Or to use mathematical formalism, the i-th node F tests whether parameter R,i exceeds a threshold ai: i.e.

$$F(R,i) > ai.$$

Thus, according to the present disclosure, each node is represented by a respective test according to which a flag may be set or unset, and for each node there is a respective test unit having an output flag. The test unit is configured to set or unset the respective output flag according to an output of the respective test. This may be contrasted with conventional decision tree processing, in which the test outcome is used to determine the next node (or leaf) for to which processing moves and typically there is no requirement to store the test outcome once processing has move on.

According to the present disclosure, instead of processing moving serially and evaluating only the tests associated with nodes in the particular path through the decision tree which is defined by the data, all the nodes evaluated independently and each output flag is either set or unset.

If the decision tree includes n nodes, then each of the flags may be considered as one of the bits of an n-bit word, where a set flag (that is to say, the test of that node yielding a positive result), corresponds to a "1" in that bit, and an unset flag corresponds to a "0" in that bit. The n-bit word may be held in a register, which could for instance and without limitation be a processor register. Alternatively, and again without limitation, the n-bit word could be stored in a memory block, which could for instance be implemented as static RAM or dynamic RAM.

In a hardware-based implementation, each test unit may be associated with a specific bit in memory, the bits together comprising the n-bit word and forming the memory.

Conversely, in a software-based implementation, the test unit may be implemented as a single instruction executed in a CPU (central processor unit), which pushes the result into the appropriate bit of the word: that is to say, the instruction T_i corresponding to the ith test at node Ti may be:

$$T\_i = \text{sign } F(R,i) - ai) << i$$

(where << is shift left in the relevant memory); to result in the relevant bit being set to "1"—if the test is positive, and "0" otherwise. The memory may be a processor register, which is particularly convenient whilst the individual tests are implemented, or may be other memory.

Then for the decision tree shown in FIG. 2, with three nodes, a software the instruction set may be, (with T_1, T_2, T_3 being separate n-bit vectors, and Rout, the memory 160):

[Compute_Value(F(R,1))]:
   T_1=sign(F(R,1)−a1)<<2
[Compute_Value(F(R,2))]:
   T_2=sign(F(R,2)−a2)<<1
[Compute_Value(F(R,3))]:
   T_3=sign(F(R,3)−a3)<<0
[Combine]:
   Return Rout[T1 OR T2 OR T3]

Alternatively, if T is the memory 160, then that memory, or register, may be populated bit-by-bit, though a sequence of "OR" instructions ("|="):

For i=0 to n−1:
   T|=sign(F(R,i)−ai)<<i−1

Figure 3:
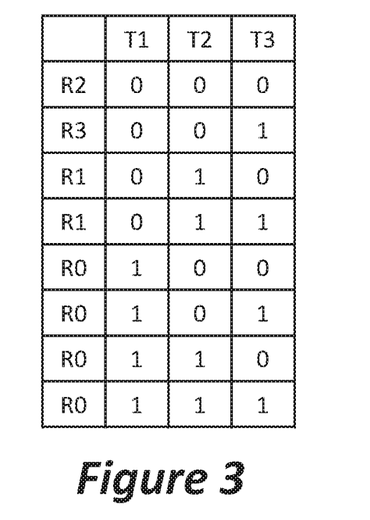
FIG. 3 shows a truth table corresponding to the decision tree of FIG. 2.

As will be immediately apparent to the skilled person, the n-bit word can take any of $2^n$ values. So, for the decision tree shown in FIG. 2, with 3 nodes, evaluating each of the tests results in a 3-bit word, which can take any of 8 values;

similarly, for the decision tree shown in FIG. 3, with 4 nodes, evaluating each of the tests results in a 4-bit word, which can take any of 16 values.

The n-bit word encodes the results of the decision tree, as can be seen from FIGS. 3 (which illustrates a truth table according to the decision tree shown in FIG. 2), and 5 (which illustrates a truth table according to the decision tree shown in FIG. 4).

Considering first FIG. 3, which illustrates a truth table according to the decision tree shown in FIG. 2: the classification or result corresponding to any and all of the combinations of test results at each node are shown to the left, for each and every possible 8 value of the n-bit word. For this highly unbalanced decision tree, the result of T1 determines whether the data is to be classified as R0 or not. If T1 is "1", then the data is classified as R0 irrespective of the results of all the other tests. In other words, the value of bit "T1" by itself determines whether the data is classified as R0. Conversely, the data is only classified as R2, if T1=0 and T2=0 and T3=0. The skilled person will observe that there are more entries in the truth table that have a corresponding result or classification of R0, than have a result or classification of R3 (and an intermediate number having classification R1).

Now turning to FIG. 5, which illustrates a truth table according to the decision tree shown in FIG. 4. Once again, the classification or result corresponding to any and all of the 16 combinations of test results at each node are shown to the left of each and every possible value of the n-bit word. In this instance the table is (somewhat) more balanced that that shown in FIG. 3, and there are is no individual test which uniquely identifies a result or specific classification.

According to the present disclosure, the truth table corresponding to the specific form (that is to say, topology) of the decision tree is stored in a data structure as a look-up table. Once the n-bit word has been completely constructed, that is to say, once all the tests have been completed, the look up table entry or bin corresponding to the value of the n-bit word is checked, in order to determine the result of the decision tree, that is to say, the classification of the data.

Importantly, the requirement for serial processing has been reduced or even eliminated by methods according to the present disclosure. It will be noted that there is no restriction on the order in which the tests have to be carried out. For high-speed or high-throughput processing engines in particular, this may be advantageous, because it facilitates parallel processing—or even massively parallel processing, without any requirement that the timing of the individual processing engines are aligned.

Figure 6:
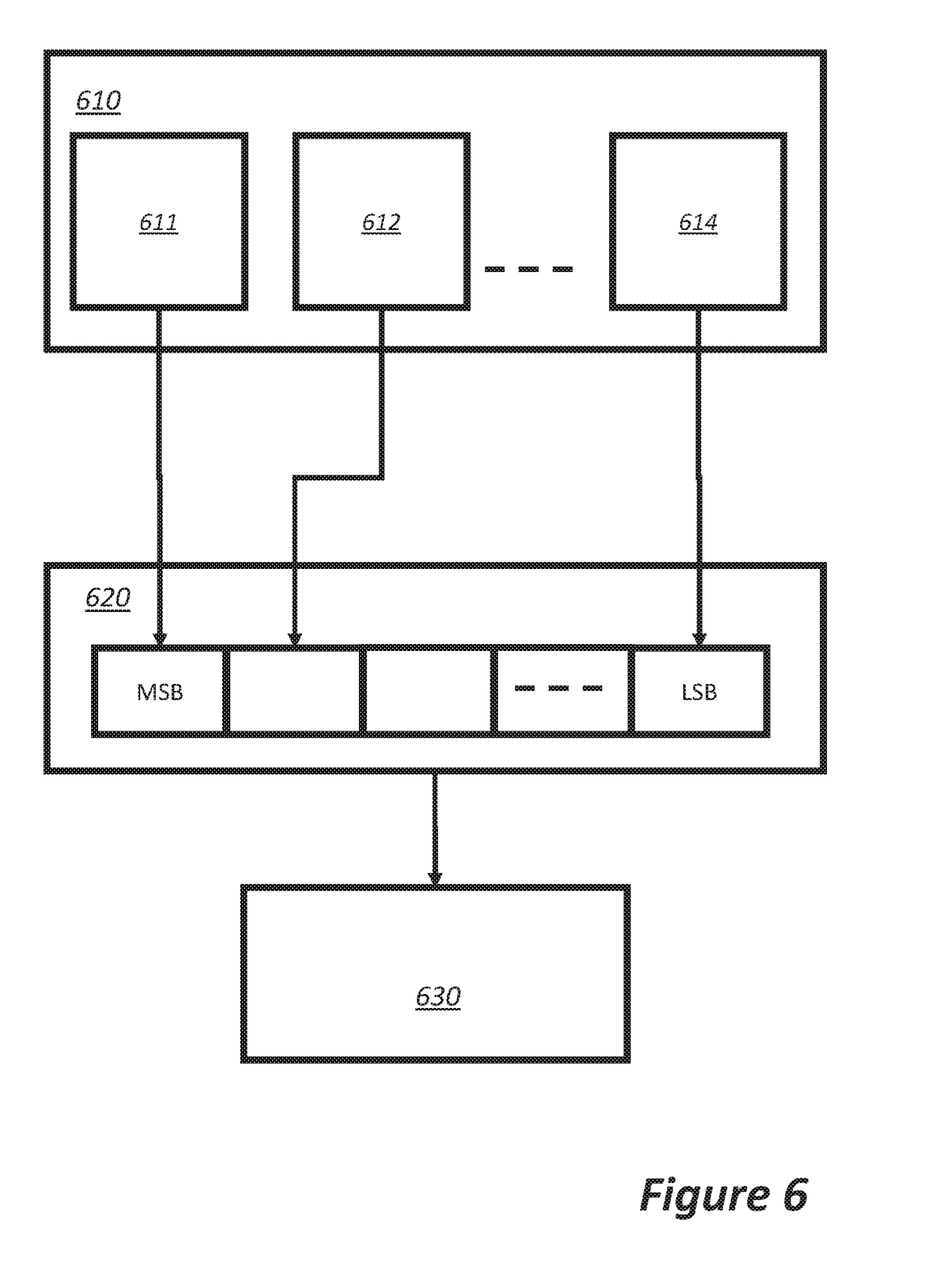
FIG. 6 is a flow-diagram of a method according to an aspect of the present disclosure.

FIG. 6 is a flow diagram of a method of classifying data according to a decision tree having n-nodes, according to the present disclosure, wherein each node is represented by a respective test according to which a flag may be set or unset. The method comprises, at 610, setting or unsetting each flag by performing the respective test on the data. As shown in FIG. 6, the individual tests 611, 612, . . . 614, do not require to be performed in any predetermined sequence, and the results do not require to be determined in any predetermined order.

The method further comprises constructing an n-bit word, each bit corresponding to a one of the n flags, as shown at 620. It will be appreciated that the bits do not required to be in a specific order. So, although in FIG. 6 the word is shown having a MSB (most significant bit), and LSB (least significant bit), any of the tests can be associated with any of the bits, provided there is a between one-to-one correspondence a specific node and a specific bit, which is thereafter retained.

The method further comprises using a predetermined look up table to classify the data according to an entry in the look up table corresponding to the n-bit word.

As mentioned above, applications which may benefit from the present disclosure are diverse, and include assisted and automated driving, and various forms of machine vision. Often such applications require a training phase, during which the system is "trained" to recognise objects by presenting many thousands of instances of data for which classification is already known, determining the outputs of the decision tree, and adjusting the thresholds of the tests at the various nodes of the decision tree, such that the classification determined by the decision tree aligns with the actual known classification. The skilled person will appreciate that processing engines and methods according to the present disclosure may be used during such a training phase. Indeed, embodiments may be particularly suited for such training, due to the large number of times the decision tree is used in training.

Furthermore, it will be appreciated, that during the training phase, typically no modification is required to the look up table. Rather, typically only the threshold criteria ai (a1, a2 etc.) require to be adjusted, according to a basic training scheme. In more complex training schemes, the tests themselves, or even the topology may require to be adapted. In such instances, the lookup table may require to be amended during, or as part of, the training scheme.

Figure 7:
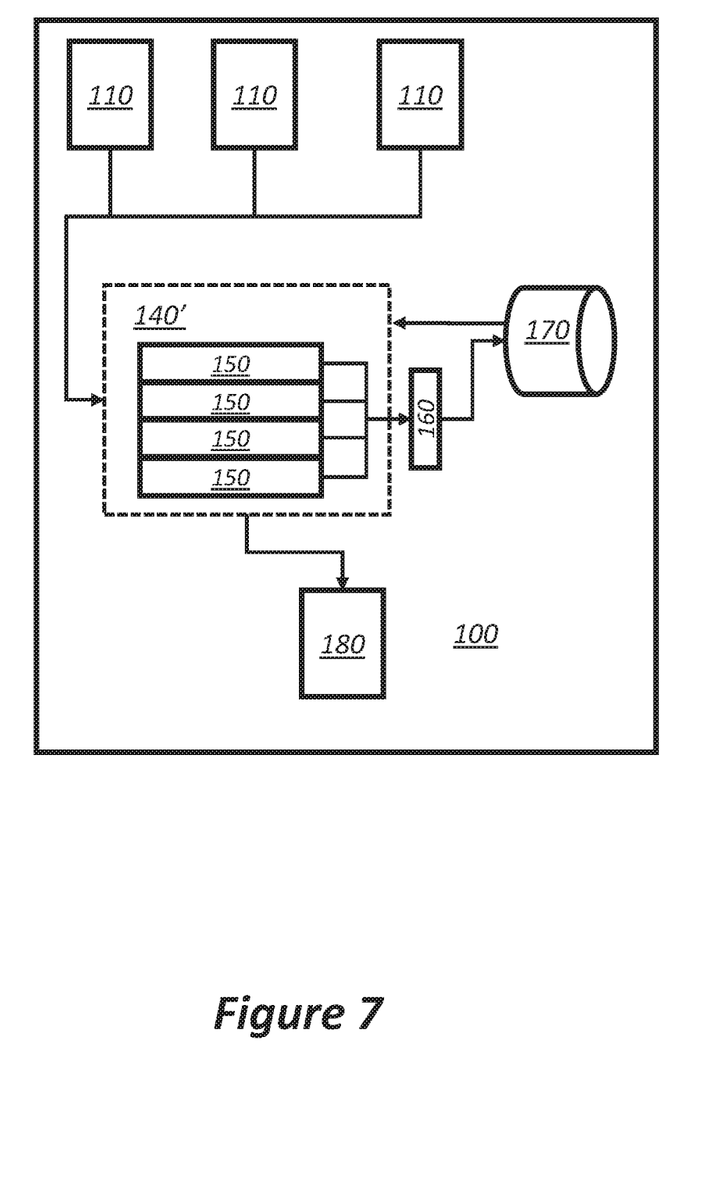
FIG. 7 illustrates a device according to one or more embodiments of the present disclosure.

Although the memory and/or the data-structure may be integral with the processing unit, in one or more other embodiments, the memory and data-structure is not integral with the processing engine. A device 100' according to such an embodiment is shown in FIG. 7. Thus according to such embodiments, there is disclosed a device 100' comprising: a processing engine 140' for classifying data according to a decision tree having n-nodes, wherein each node is represented by a respective test according to which a flag may be set or unset, and comprising a respective test unit 150 corresponding to each node, having an output flag and being configured to set or unset the respective output flag according to an output of the respective test; the device further comprising a memory 160 configured to hold an n-bit word, each bit corresponding to a one of the respective output flags; and a data-structure 170 configured as a look up table, each entry of the look up table representing a class of the data. The configuration of the different elements in such embodiments is the same as that shown in FIG. 1, except that the memory 160 and the lookup table 170 are not integral to the processing engine 140'. There may be one or more surveillance units, and there may be a response unit, both as shown in FIG. 110. The device may be, for instance, an object recognition unit, an automobile device, or a machine learning device.

In one or more of such embodiments, the test units are distributed across one of: a plurality of processing elements; a plurality of microprocessors, and a plurality of cores of a microprocessor.

In one or more of such embodiments, the look up table has $2^n$ entries.

In one or more of such embodiments, the decision tree includes at least one sub-branch.

The disclosure further extends: to an object recognition unit including a device 100' as described above, and at least one surveillance device; to an automobile device for supporting at least one of advanced driver assistance and autonomous driving, comprising a surveillance unit, device 100' as described above, and a response unit configured to, in response a classification determined by the processing engine, provide at least one of: an output indicative of a suggested driver response, and a vehicle response; and to a machine learning device comprising a device 100' as described above, and a learning unit configured to modify a part of the look up table.

From reading the present disclosure, other variations and modifications will be apparent to the skilled person. Such variations and modifications may involve equivalent and other features which are already known in the arts of machine learning and decision tree data classification, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A processing engine for classifying data according to a decision tree having n-nodes, wherein each node is represented by a respective test according to which a flag may be set or unset, comprising:
    a respective test unit circuit corresponding to each node, having an output flag and being configured to set or unset the respective output flag according to an output of the respective test;
    a memory device configured to hold an n-bit word, each bit corresponding to a one of the respective output flags;
    a data-structure configured as a look up table, each entry of the look up table representing a class of the data; and
    a response unit circuit configured to, in response a classification determined by the processing engine, provide at least one of: an output indicative of a suggested vehicle driver response, and a vehicle response.

2. A processing engine according to claim 1, wherein the look up table has $2^n$ entries.

3. A processing engine according to claim 1, wherein the test unit circuits are distributed across a plurality of processing elements.

4. A processing engine according to claim 1, wherein the test unit circuits are distributed across at least one of: a plurality of microprocessors, and a plurality of cores of a microprocessor.

5. A processing engine according to claim 1, wherein the decision tree has no sub-branches.

6. A processing engine according to claim 1, wherein the decision tree includes at least one sub-branch.

7. An object recognition unit including a processing engine as claimed in claim 1, and at least one surveillance device.

8. A machine learning device comprising a processing engine as claimed in claim 1, and a learning unit configured to modify a part of the look up table.

9. A method of classifying data according to a decision tree having n-nodes, wherein each node is represented by a respective test according to which a respective flag may be set or unset, the method comprising:
    setting or unsetting each flag by performing the respective test on the data;
    constructing an n-bit word, each bit corresponding to a one of the n flags;
    using a predetermined look up table to classify the data according to an entry in the look up table corresponding to the n-bit word; and
    in response to a classification of the data, providing at least one of: an output indicative of a suggested vehicle driver response, and a vehicle response.

10. A method according to claim 9, wherein the tests are distributed across a plurality of processing engines.

11. A method according to claim 10, wherein the plurality of processing engines comprises at least one of: a plurality of microprocessors, and a plurality of cores of a microprocessor.

12. A method according to claim 9, wherein the decision tree has no sub-branches.

13. A method according to claim 9, wherein an i-th test, $(T\_i)$ on the data $(R)$ takes the form:

$$(F(R,i) > a_i).$$

14. A method according to claim 12, wherein an i-th bit of the n-bit word is determined according to a computation:

$$T\_i = \text{sign } F(R,i) - a_i << i.$$

* * * * *